Jan. 26, 1965

H. M. L. BOSTEELS 3,167,636

AUTOMATIC ELECTRIC ARC WELDING MACHINE

Filed April 24, 1962

Jan. 26, 1965  H. M. L. BOSTEELS  3,167,636
AUTOMATIC ELECTRIC ARC WELDING MACHINE
Filed April 24, 1962  3 Sheets-Sheet 3
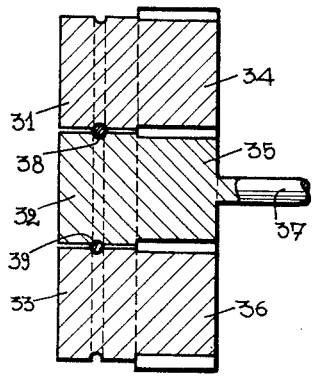
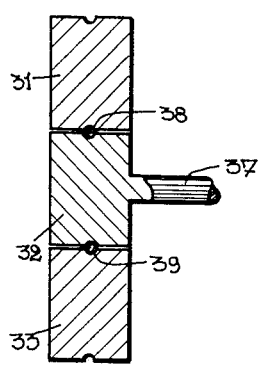
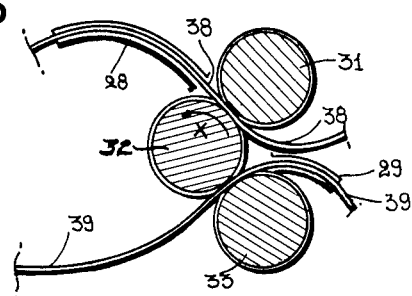

United States Patent Office 3,167,636
Patented Jan. 26, 1965

3,167,636
AUTOMATIC ELECTRIC ARC WELDING
MACHINE
Henri Marie Louis Bosteels, Uccle, Brussels, Belgium,
assignor to La Soudure Electrique Autogene, Procedes
Arcos, Anderlecht, Brussels, Belgium
Filed Apr. 24, 1962, Ser. No. 189,885
Claims priority, application Belgium, May 3, 1961,
603,366
2 Claims. (Cl. 219—125)

The present invention relates to an automatic electric arc welding machine, which comprises a carriage displaceable in parallel with the joint to be welded and whereon are mounted two inclined welding wire-guides, two wires fed forward at the same time and at identical speed by means of grooved rollers which are also mounted on said displaceable carriage passing through said wire-guides.

Machines of this nature are known, wherein a motor mounted on a displaceable carriage of the suspended type drives two reducing gears which are also mounted on said displaceable carriage and each drives one pair of wire feed rollers. The two wire-guides are swivellably mounted on the displaceable carriage with the interposition of a piece carrying the two feed rollers of the corresponding welding wire, said piece being pivotable about the axis of the driving roller. Owing to their great overall dimensions, these machines possess the disadvantage, that it is difficult to manipulate them to set the freestanding extremities of the welding wires with sufficient accuracy at the welding points. The angle of inclination of said two wire-guides must be adjusted before the welding operation and cannot therefore be varied during said operation. Moreover, and in view of the fact, that said machine comprises a reduction gear and a mechanical connection between the single motor and each pair of wire feed rollers, it leaves but little space available for the disposition of devices controlling the welding current and the feeding speed of said wires.

The same disadvantages arise, where the carrier on which said wire-guides may be swivelled is mounted to roll along one of the pieces which are to be welded, instead of being of the suspended type.

Machines are also known, wherein a greater volume of space is available for the disposition of the control devices on the carriage or support displaceable in parallel alignment with the joint, by virtue of the fact, that a separate assembly is provided for each of the two wires, which is swivellable relative to said support and comprises one motor feeding forward the corresponding wire, a reduction gear, a wire feed mechanism and a wire-guide. An assembly of this nature forms a unit described as a welding head by convention, and this in twin-head welding machines as well as in single-head welding machines.

In certain forms of construction, each welding head is carried on an arm or lever freely pivotable relative to the displaceable carrier or support, in a manner similar to that already applied in the case of a machine whereof the support bears but one welding head.

The cost of these machines comprising two swivellable welding heads is substantially higher than that of machines requiring one motor only for the forward feed of both welding wires.

The purpose of the present invention is to contrive the economical construction of machines utilizing two welding wires in conjunction with a single feed mechanism actuating said two wires, said single feed mechanism moreover being apt to be driven by means of a single reduction gear coupled to the sole motor assuring the forward feed of said two wires.

In the machine according to the present invention, two flexible and inextensible sheaths traversed by said wires connect said two wire-guides with a single wire feed mechanism, and each of the two wires passes between two grooved rollers whereof at least one is driven by means of a single reduction gear.

The machine according to the present invention is moreover lighter in weight than a machine comprising two reduction gears and two wire feed mechanisms, and by virtue of this fact enables all the electrical equipment required to be mounted in the adequate space available on the displaceable carriage.

The mechanism feeding forward the two wires comprises three rollers only, whereof one alone is driven, whereas the other two rollers thrust the two wires against said driven roller.

The two wires are then displaced in opposite directions, but the flexible and inextensible sheaths through which they travel easily guide said wires into the wire-guides and through the latter to the welding points.

In a preferred form of embodiment of the present invention, whereby wire take-up off the conventional reels and wire delivery towards the wire-guides are facilitated, the spindles of said three rollers are disposed in the same vertical plane.

According to an additional feature, the wire-guides referred to above, are carried on pivot arms or levers mounted in removable manner on spindles parallel to the direction of travel of the machine, and after removal of said arms or levers, said spindles may be utilised to mount a cross-piece or member carrying a support for a guide roller and for two wire-guides disposed one behind the other as well as behind said guide roller.

A machine equipped in this manner may be utilised to weld a chamfered joint instead of two simultaneous weld seams in the angles formed between a web and a piece to which it is to be attached.

The present invention is hereinafter to be particularly described by way of example and in no manner by way of limitation, with reference to the accompanying drawings, wherein:

FIGURE 1 shows a view in frontal elevation of the machine set in readiness to start the welding of the two sides of a web which is to be secured to a flat piece;

FIGURE 2 to enlarged scale shows a view in frontal elevation of the lower part of the machine according to FIGURE 1;

FIGURE 3 shows a perspective drawing of said machine;

FIGURE 4 to enlarged scale shows a vertical section taken through the axes of the three feed rollers of FIGURE 1;

FIGURE 5 shows a section analogous to that of FIGURE 4 as applicable in a modification of the mechanism for the simultaneous forward feed of both wires;

FIGURE 6 shows a diagrammatical view in frontal elevation of the additional modification of the mechanism for the simultaneous forward feed of both wires.

The same reference numerals are used in the above figures to denote identical parts.

Figure 1:
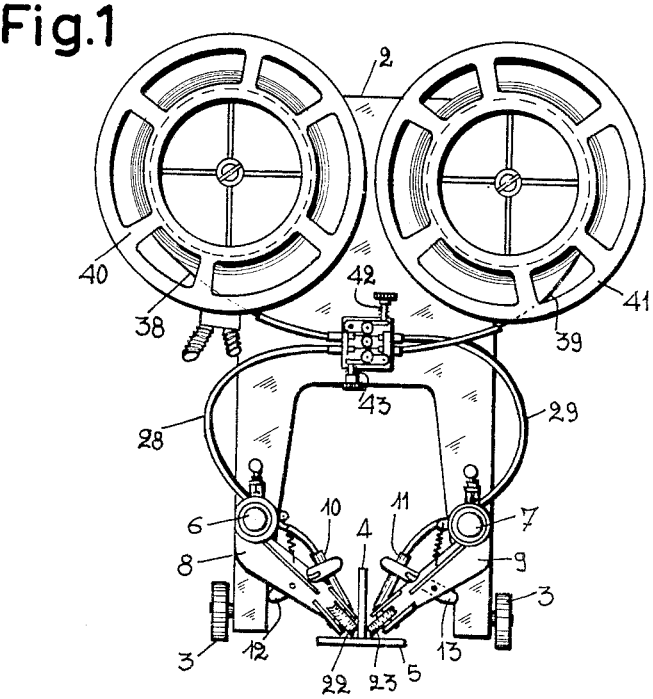
Figure 2:
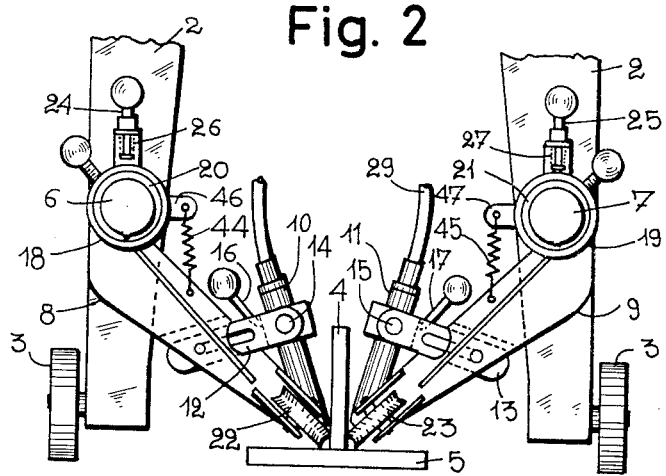
Figure 3:
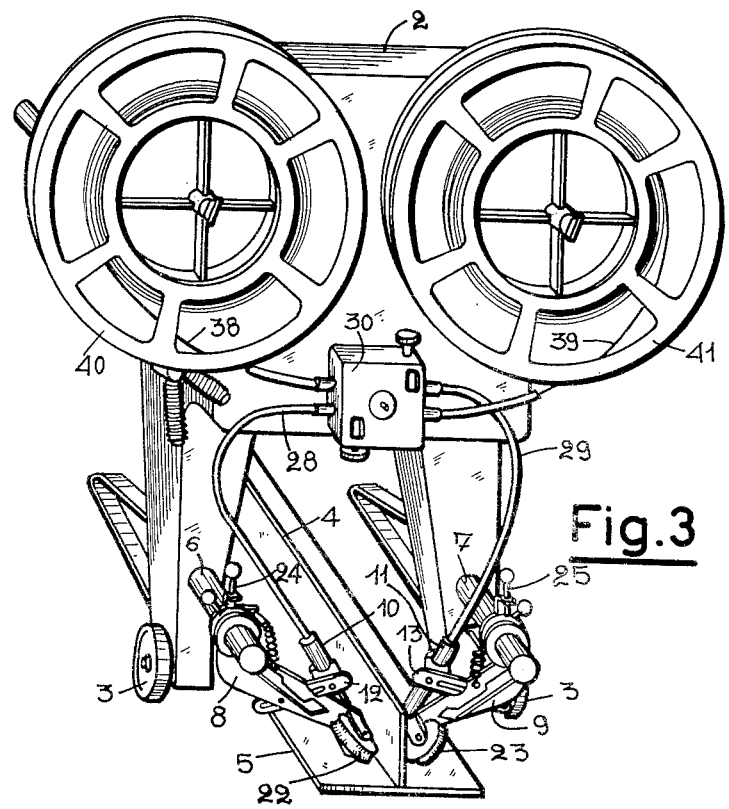

The machine illustrated in FIGURES 1 and 3 comprises a frame 2 carried on wheels 3 which are displaceable in parallel alignment with two weld joints to be produced simultaneously in the angles formed between a web 4 which is to be attached to a flat piece 5 and said piece. Said frame exhibits two horizontal pivot pins 6 and 7 which extend in parallel alignment with the joint to be welded when the machine is in operation and whereon are pivotable two arms or levers 8 and 9 whereon wire-guides 10 and 11 are mounted with the interposition of setting slides 12 and 13. After the loosening of a setting screw, said slides, which have an elongated hole, allow the distance of the wire-guides from the workpieces to be set by displacement with respect to said arms or levers 8 and 9. The angle of inclination of said wire-guides with respect to said arms may be modified before the welding operation thanks to pivots 14 and 15 (FIGURE 2) fixed to the wire-guides and locking levers 16 and 17.

The arms 8 and 9 are integral with sleeves 18 and 19 which are freely pivotable about bushings 20 and 21 secured to the pivot pins 6 and 7, and guide rollers 22 and 23 secured to the lower extremities of said arms are adapted to travel along the apexes of the angles formed between the pieces 4 and 5 which are to be welded.

The bushings 20 and 21 also support pegs 24 and 25 set above the sleeve 18 and 19 and tensioned towards the latter by means of springs 26 and 27. Said pegs automatically drop into notches wrought in said sleeves 18 and 19 when said notches are brought into alignment with said pegs by raising the arms 8 and 9. The position of said notches is so selected in respect of the arms 8 and 9, that the guide rollers are held at an adequate distance from the floor when the machine is to be taken from one welding station to another. During a welding operation, said pegs are clear of the corresponding notches in the sleeves 18 and 19 and enable the arms 8 and 9 to be freely pivoted about the bushings 20 and 21 under the action of the guide rollers 22 and 23 rolling in contact with the pieces which are to be assembled. Springs 44 and 45 (see FIGURE 2), secured to lugs 46 and 47 which are integral with the bushings 20 and 21 and to the arms 8 and 9 prevent the rollers 22 and 23 from dropping below the lowest level of the wheels 3 whilst the machine is made to travel between two welding operations.

The wire-guides 10 and 11 whereof the position may be adjusted with respect to the frame 2, are by means of flexible and inextensible sheaths 28 and 29 connected to a dual wire feed mechanism carried on said frame. This sole dual wire feed mechanism is housed within a case 30 and is driven by means of a single reduction gear and a single motor which are not shown for the sake of clearness but are disposed in the upper part of said frame. Drive is transmitted to the two wires through three grooved rollers integrally coupled with three sprockets meshing with each other and whereof only one is driven by the reduction gear which latter has not been illustrated. In FIGURE 4, the three grooved rollers bear the reference numerals 31, 32 and 33 and are disposed in such manner, that their axes extend in the same vertical plane, as apparent from FIGURE 1. These three rollers are adjacent to three sprockets 34, 35 and 36 with which they are integral. The central sprocket 35 driven by the sole reduction gear through the output shaft 37 of the latter transmits said drive to the other sprockets 34 and 36 so that each of the wires 38 and 39 wound off the reels 40 and 41 (see FIGURES 1 and 3) mounted on the frame, is acted upon by two driven rollers.

The outer rollers 31 and 33 are resiliently loaded towards the central roller 32 by means of springs such as those bearing the reference numerals 42 and 43 in FIGURE 1.

FIGURE 5 illustrates a mechanism for the forward feed of the two wires 38 and 39 wherein only the central roller 32 is driven, since the rollers 31 to 33 no longer comprise meshing sprockets integral therewith. Although in this case, the drive is transmitted to each of said two wires over approximately half their periphery only, said drive remains possible if the pressure exerted by the undriven rollers 31 and 33 is adequate.

It is apparent from FIGURE 6, that the three grooved rollers 31 to 33 have axes which do not extend in the same plane, and that the wires 38 and 39 are correspondingly fed forward towards the left and right when the driven roller 32 turns in the direction of the arrow X. This dual feed mechanism does not entail the need to make all three rollers of the driven type either.

It is understood, that the present invention is not limited to the forms of embodiment hereinbefore described by way of example and not of limitation, and that modifications or technical equivalents may be utilised without thereby exceeding the scope of the invention.

What I claim is:

1. In an automatic electric arc welding machine for simultaneously welding two joints in the angles formed on either side of a vertical web to be welded to a horizontal piece, a movable frame displaceable in parallel alignment with the two weld joints, a wire feed mechanism on the frame comprising a driving roller journalled on the frame, a circumferentially extending groove in the driving roller for receiving weld wire, two driven rollers journalled on the frame, each of said driven rollers displaced from one another and in circumferential contact with the driving roller and adapted to force the weld wire against the driven rollers whereby two weld wires are fed through the feed mechanism at equal linear speeds in divergent directions, drive means for the driving roller, sheaths on the frame for receiving the weld wires from the driving roller and guiding the weld wires arcuately from a divergent to a convergent direction, and oblique guides on the frame for receiving the weld wire from the sheaths and guiding the weld wires toward the joints.

2. A machine of claim 1 in which the axes of the three rollers of the dual wire feed mechanism are in one and the same vertical plane.

References Cited by the Examiner
UNITED STATES PATENTS 2,654,015 9/53 Landis et al. _____ 219—73
2,658,162 11/53 Tichemor et al. _____ 314—36
2,911,517 11/59 Armstrong _____ 219—125

RICHARD M. WOOD, *Primary Examiner.*

UNITED STATES PATENT OFFICE
CERTIFICATE OF CORRECTION

Patent No. 3,167,636

January 26, 1965

Henri Marie Louis Bosteels

It is hereby certified that error appears in the above numbered patent requiring correction and that the said Letters Patent should read as corrected below.

Column 4, lines 33, 36 and 43, for "wire", each occurrence, read -- wires --; same column 4, line 37, for "driven rollers" read -- driving roller --.

Signed and sealed this 5th day of October 1965.

(SEAL)
Attest:

ERNEST W. SWIDER
Attesting Officer

EDWARD J. BRENNER
Commissioner of Patents